(12) United States Patent
Willems (10) Patent No.: US 12,185,672 B2
(45) Date of Patent: Jan. 7, 2025

(54) SHREDDER FOR SHREDDING AGRICULTURAL PRODUCTS

(71) Applicant: V.D.W. CONSTRUCTIE, Waarschoot (BE)

(72) Inventor: Erwin Willems, Waarschoot (BE)

(73) Assignee: V.D.W. CONSTRUCTIE, Waarschoot (BE)

( * ) Notice: Subject to any disclaimer, the term of this patent is extended or adjusted under 35 U.S.C. 154(b) by 0 days.

(21) Appl. No.: 17/768,644

(22) PCT Filed: Oct. 16, 2020

(86) PCT No.: PCT/IB2020/059764
§ 371 (c)(1),
(2) Date: Apr. 13, 2022

(87) PCT Pub. No.: WO2021/074881
PCT Pub. Date: Apr. 22, 2021

(65) Prior Publication Data
US 2024/0000024 A1    Jan. 4, 2024

(30) Foreign Application Priority Data

Oct. 16, 2019 (BE) .................................. 2019/5708

(51) Int. Cl.
*A01F 29/12* (2006.01)
*A01F 29/00* (2006.01)
(Continued)

(52) U.S. Cl.
CPC ............ *A01F 29/12* (2013.01); *A01F 29/005* (2013.01); *A01F 29/01* (2013.01); *A01F 29/04* (2013.01)

(58) Field of Classification Search
CPC ........ A01F 29/005; A01F 29/06; A01F 29/04; A01F 29/12
See application file for complete search history.

(56) References Cited

U.S. PATENT DOCUMENTS 4,350,207 A * 9/1982 Ben-Dor ............ A01D 34/8355
171/58
2010/0258662 A1* 10/2010 Frey ...................... A01F 29/005
241/280
(Continued)

FOREIGN PATENT DOCUMENTS

EP          3 017 685 A1     5/2016
WO    WO-2020115278 A1 *  6/2020 ........... A01F 29/005

OTHER PUBLICATIONS

Translation of WO-2020115278 (Year: 2020).*
(Continued)

*Primary Examiner* — Bobby Yeonjin Kim
(74) *Attorney, Agent, or Firm* — Lewis Roca Rothgerber Christie LLP (57) ABSTRACT

Shredder for shredding agricultural products, such as bales of straw, the shredder comprising: a shredding device (20) for shredding the loaded agricultural products and a blowing device (5) for blowing the shredded agricultural products from the shredding device (20) toward and through an outlet opening (3), wherein the blowing device (5) comprises at least two blowing elements (21*a*, 21*b*), wherein the two blowing elements (21*a*, 21*b*) are arranged rotatably about their respective blowing rotational axis, wherein rotating the blowing elements (21*a*, 21*b*) about their blowing rotational axis causes the shredded agricultural products to be blown from the shredding device (20) toward and through the outlet opening (3).

12 Claims, 6 Drawing Sheets

(51) Int. Cl.
*A01F 29/01* (2006.01)
*A01F 29/04* (2006.01)

(56) References Cited

U.S. PATENT DOCUMENTS

| | | | | |
|---|---|---|---|---|
| 2015/0069158 A1* | 3/2015 | Graham | ................. | A01K 5/005 |
| | | | | 241/101.5 |
| 2015/0189837 A1* | 7/2015 | Roger | ................... | A01F 29/095 |
| | | | | 241/101.5 |

OTHER PUBLICATIONS

International Search Report and Written Opinion for corresponding PCT Patent Application No. PCT/IB2020/059764, mailed Jan. 26, 2021 (10 sheets).
International Preliminary Report on Patentability for corresponding PCT Patent Application No. PCT/IB2020/059764, mailed Jan. 20, 2022 (13 sheets).

* cited by examiner

SHREDDER FOR SHREDDING AGRICULTURAL PRODUCTS

CROSS-REFERENCE TO RELATED APPLICATIONS

This application is a National Phase Patent Application and claims priority to and the benefit of International Patent Application Number PCT/162020/059764, filed on Oct. 16, 2020, which claims priority to Belgian Patent Application Number BE2019/5708, filed on Oct. 16, 2019. The entire contents of both of which are incorporated herein by reference.

TECHNICAL DOMAIN

The present invention relates to a shredder for shredding agricultural products, such as bales of straw. In particular, the present invention relates to an agricultural vehicle, such as a forklift, tractor or telescopic handler, equipped with the shredder. Furthermore, the present invention relates to the use of a shredder for shredding agricultural products.

PRIOR ART

Shredders for shredding agricultural products, such as bales of straw, are already known in the art. For example, the patent publication EP3017685 discloses a shredder for shredding bales of straw for spreading the shredded straw over a large area. The known shredder comprises an inlet opening through which the agricultural products are loaded into the shredder, a shredding device for shredding the loaded agricultural products, a feeding device for transporting the loaded agricultural products from the inlet opening to the shredding device along a feed direction (in particular, a pulling screw is disclosed), an outlet opening through which the shredded agricultural products are removed from the shredder, and a blowing device for blowing the shredded agricultural products from the shredding device toward and through the outlet opening, wherein the blowing device comprises a first blowing element, wherein the first blowing element is rotatably arranged about a first blowing rotational axis, wherein rotating the first blowing element about the first blowing rotational axis causes the shredded agricultural products to be blown from the shredding device toward and through the outlet opening.

However, the shredder from the known art has the disadvantage that, despite the low power requirements of the shredder, only the largest agricultural vehicles, such as the largest tractors, can be equipped with the shredding device. In spite of their low power requirements, the shredders from the known art are so high that only the largest agricultural vehicles can be used, as in the largest agricultural vehicles the driver is seated sufficiently high to be able to see over the shredding device. These largest tractors are, however, expensive, and therefore in short supply on farms. Due to their scarcity, they are preferably only used for agricultural applications having high power requirements. Furthermore, it was found that even when using the largest agricultural vehicles, drivers still struggle to see over the shredders. For that reason, the shredders in the art are provided with a mirror element arranged on top of the shredder to allow seeing over the shredder indirectly. However, it is desirable to be able to see directly over the shredder. It is therefore desirable to provide a shredder that can also be used by smaller and less expensive agricultural vehicles.

DESCRIPTION OF THE INVENTION

It is an aim of the present invention to provide a shredder, which shredder can be used by smaller and therefore less expensive agricultural vehicles. To this aim, the present invention provides a shredder for shredding agricultural products, such as bales of straw, according to the first claim. The shredder according to the present invention thereto comprises:
a) an inlet opening through which the agricultural products are loaded into the shredder,
b) a shredding device for shredding the loaded agricultural products,
c) an outlet opening through which the shredded agricultural products are removed from the shredder,
d) a blowing device for blowing the shredded agricultural products from the shredding device toward and through the outlet opening, wherein the blowing device comprises a first blowing element, wherein the first blowing element is rotatably arranged about a first blowing rotational axis, wherein rotating the first blowing element about the first blowing rotational axis causes the shredded agricultural products to be blown from the shredding device toward and through the outlet opening, and
e) a feeding device for transporting the loaded agricultural products along a feed direction from the inlet opening toward the blowing device.

The blowing device of the shredder of the present invention further comprises a second blowing element, wherein the second blowing element is rotatably arranged about a second blowing rotational axis, wherein rotating the second blowing element about the second blowing rotational axis causes the shredded agricultural products to be blown from the shredding device toward and through the outlet opening.

The present invention offers the advantage that the blowing device comprises multiple blowing elements, for example at least two, contrary to the state of the art, where the blowing device only comprises a single blowing element. The inventors have found that providing multiple blowing elements allows the shredder to be made wider and lower, without thereby reducing the total surface area of the blowing device. Indeed, the surface area of the blowing device determines the blowing power of the blowing device. In particular, in view of the circular structure of the blowing elements, the height of the shredder can be reduced by about 30% relative to the height of the shredder from the known art, without any significant loss in blowing power. Reducing the height of the shredder allows smaller and less expensive agricultural vehicles to be used for handling the shredders, since the smaller, and thus low agricultural vehicle will still allow seeing over the lowered shredder.

According to an embodiment of the present invention, the blowing device comprises only two blowing elements. According to an alternative embodiment of the present invention, the blowing device comprises additional blowing elements. The additional blowing elements preferably exhibit the same properties as the second blowing element. In particular, the additional blowing element relates to the second blowing element as the second blowing element relates to the first blowing element.

According to an embodiment of the present invention, the first blowing rotational axis and the second blowing rotational axis are substantially parallel to each other, for example parallel to each other. Arranging the blowing rotational axes in parallel increases the suction power of the blowing device along the direction parallel to the blowing rotational axes. In this way, the shredded agricultural products are blown away optimally. According to an embodiment of the present invention, the first blowing rotational axis and the second blowing rotational axis are not coaxial. The first and second blowing rotational axes are for example parallel to each other, but are not in line with each other. Between the first and second blowing rotational axes, a perpendicular distance is provided, preferably at least twice as large as the height of the blades of the blowing elements, as described below. According to an embodiment of the present invention, the first blowing element and the second blowing element are adjacent. Preferably, the first blowing element and the second blowing element are in the same plane taken perpendicular to one of the blowing rotational axes.

According to an embodiment of the present invention, the feed direction is substantially parallel to the first blowing rotational axis. If the first blowing rotational axis is parallel to the second blowing rotational axis, it follows that the second blowing rotational axis is substantially parallel to the feed direction.

According to an embodiment of the present invention, each blowing element comprises a blowing rotational shaft extending along the blowing rotational axis. Preferably, each blowing element comprises a set of blades connected to the blowing rotational shaft. The blades are for example arranged, upon rotation of the blowing rotational shaft, to suck in shredded agricultural products along a direction parallel to the blowing rotational axis, and to then blow the shredded agricultural products away radially toward and through the outlet opening. According to an embodiment of the present invention, a single outlet opening is provided. Preferably, each blowing element is arranged for blowing the shredded agricultural products from the shredding device toward and through the single outlet opening. Preferably, and particularly when two blowing elements are provided, the outlet opening is at the boundary between two blowing elements. The two blowing elements are for example arranged to rotate in a reverse direction about their respective blowing rotational axes, so that the blades of both blowing elements carry out an upward movement near the boundary between the two blowing elements.

According to an embodiment of the present invention, a blowing pipe is provided on top of the outlet opening. The blowing pipe is for example an adjustable pipe, allowing the user to determine, by adjusting the pipe, where the shredded agricultural products are blown. The blowing pipe is for example connected by means of a flange connection to the outlet opening. The blowing pipe in turn ends in an outflow opening.

According to an embodiment of the present invention, the shredder further comprises a gathering device. The gathering device is arranged for gathering the supplied or shredded agricultural products in a pile near the blowing rotational axes. Piling up the agricultural products near the blowing rotational axis ensures that the agricultural products, for example after being shredded, can be optimally sucked in by the blowing elements. According to an embodiment of the present invention, the gathering device gathers the agricultural products by moving the agricultural products in a direction substantially perpendicular to the feed direction. According to an embodiment of the present invention, the gathering device gathers the agricultural products by moving the agricultural products in a direction substantially perpendicular to the direction of the parallel blowing rotational axes. According to an embodiment of the present invention, the gathering device is a gathering shaft rotatable about a gathering rotation axis. The gathering shaft is preferably a single, preferably rectilinear shaft, regardless of the number of blowing elements provided in the blowing device. The gathering shaft is preferably arranged to rotate in its entirety about the gathering rotational axis. The gathering shaft is for example not divided into portions that each rotate in another direction about the gathering rotational axis. The gathering rotational axis is preferably substantially perpendicular to the feed direction. The gathering rotational axis is for example substantially perpendicular to the direction of the parallel blowing rotational axes. The gathering shaft is preferably provided with at least one helical portion comprising a left-handed screw portion and a right-handed screw portion. The gathering shaft is for example a cylindrical shaft provided with a screw thread. The thread is preferably formed by a long, narrow plate arranged helically about the cylindrical shaft. The left-handed screw portion and right-handed screw portion of each helical portion of the gathering shaft are preferably positioned relative to one another in such a way that the agricultural products reaching the helical portion at a left-handed screw portion are moved toward the right-handed screw portion, and that the agricultural products reaching the helical portion at a right-handed screw portion are moved toward the left-handed screw portion. Preferably, each helical portion is positioned relative to the blowing rotational axes in such a way that the junction between the left-handed screw portion and the right-handed screw portion is located near one of the blowing rotational axes. According to an embodiment of the present invention, the number of helical portions of the gathering shaft equals the number of blowing units in the blowing device. This allows each helical portion to gather/concentrate the agricultural products near a blowing rotational axis assigned to it.

According to an embodiment of the present invention, the shredding device comprises a set of shredding teeth. The shredding teeth are for example a set of sharp elements arranged for shredding and/or cutting the agricultural products when the agricultural products and the shredding teeth come into contact with each other and move relative to each other. According to a first implementation, the set of shredding teeth is provided in each helical portion of the gathering shaft between the left-handed screw portion and the right-handed screw portion. Rotating the gathering shaft about the gathering rotational axis thereby causes rotation of the shredding teeth, so as to shred and/or cut the agricultural products. This first implementation is especially advantageous as the agricultural products, due to the action of the gathering shaft, are already conveyed toward the junction of the left-turning and right-handed screw portion of the helical portion, where the shredding teeth are provided. In a second implementation, for example as an alternative to the first implementation or in cooperation with the first implementation, the shredding device is provided with a shredding rod provided with the set of shredding teeth (or a further set of shredding teeth when the second implementation is used in cooperation with the first implementation), wherein the shredding rod is rotatably arranged relative to a shredding rod rotational axis and wherein rotating the shredding rod about the shredding rod rotational axis causes rotation of the shredding teeth for shredding agricultural products. Preferably, a separate shredding rod is provided for each blowing element. Preferably, the shredding rod rotational axis is parallel to the blowing rotational axis, for example that of a blowing element assigned to it. The shredding rod rotational axis is preferably coaxial to the blowing rotational axis, for example that of a blowing element assigned to it. This implementation offers the advantage that the shredding rod barely decreases the suction power of the blowing elements. An additional advantage is that voluminous agricultural products, such as bales of straw, can be easily torn apart by the shredding rod, as the shredding rod penetrates the voluminous agricultural product substantially centrally. Preferably, the shredding rod is connected to the blowing rotational shaft, for example that of a blowing element assigned to it. As a result, the rotational movement of the blowing rotational shaft is immediately converted into a rotational movement of the shredding rod. In a third implementation, as an alternative to the first and second implementation, or in cooperation with the first and/or second implementation, the shredding device comprises, for each blowing element, a shredding ring provided with shredding teeth (or additional shredding teeth when the third implementation is implemented in cooperation with the first and or/second implementation), wherein the shredding ring is rotatably arranged about a shredding ring rotational axis, preferably parallel and coaxial to the blowing rotational axis. Preferably, the shredding ring is driven along its periphery.

According to an embodiment of the present invention, the feeding device is at least one of an inclined plane, a moving floor and a pulling screw. The inclined plane is preferably formed by a bottom wall tilted at an angle to the floor wherein the agricultural products slide over the bottom wall, for example by tilting the agricultural device at an angle. The movable floor is for example an endless carpet arranged on top of or in place of the aforementioned bottom wall. The pulling screw preferably comprises a helical shaft, wherein the helical shaft is rotatably arranged relative to a pulling screw rotational axis. Rotating the helical shaft about the pulling screw rotational axis preferably pulls the agricultural products from the inlet opening toward the blowing device. In an embodiment, the pulling screw is arranged on the shredding rod of the shredding device.

It is a further aim of the present invention to provide an agricultural vehicle, wherein the agricultural vehicle is provided with a shredder as discussed above.

It is a further aim of the present invention to provide a use of the aforementioned shredder. Preferably, the shredder is used for shredding bales of straw. Preferably, the shredder is used by connecting it to an agricultural vehicle such as a forklift, tractor or telescopic handler.

DESCRIPTION OF THE FIGURES

The present invention will hereafter be described with respect to particular embodiments and with reference to certain drawings, but the invention is not limited thereto and is defined only by the claims. The drawings shown here are merely schematic depictions and are non-limiting. In the drawings, the dimensions of certain parts may be exaggerated, meaning that the parts in question are not drawn to scale, and are for illustrative purposes only. The dimensions and the relative dimensions do not necessarily correspond to the actual reductions to practice of the invention.

Furthermore, terms such as "first", "second", "third" and the like are used in the description and in the claims for distinguishing between similar elements, and not necessarily for describing a sequential or chronological order. The terms in question are interchangeable under the appropriate circumstances and the embodiments of the invention can operate in other sequences than described or illustrated here.

The term "comprising" and derivative terms, as used in the claims, should not be interpreted as being restricted to the means listed respectively thereafter; the term does not exclude other elements or steps. It should be interpreted as specifying the stated features, integers, steps or components as referred to, without, however, precluding the presence or addition of one or more additional features, integers, steps or components, or groups thereof. Thus, the scope of an expression such as "a device comprising means A and B" is not limited to devices consisting only of components A and B. What is meant, on the contrary, is that with respect to the present invention, the only relevant components of the device are A and B.

Figure 1:
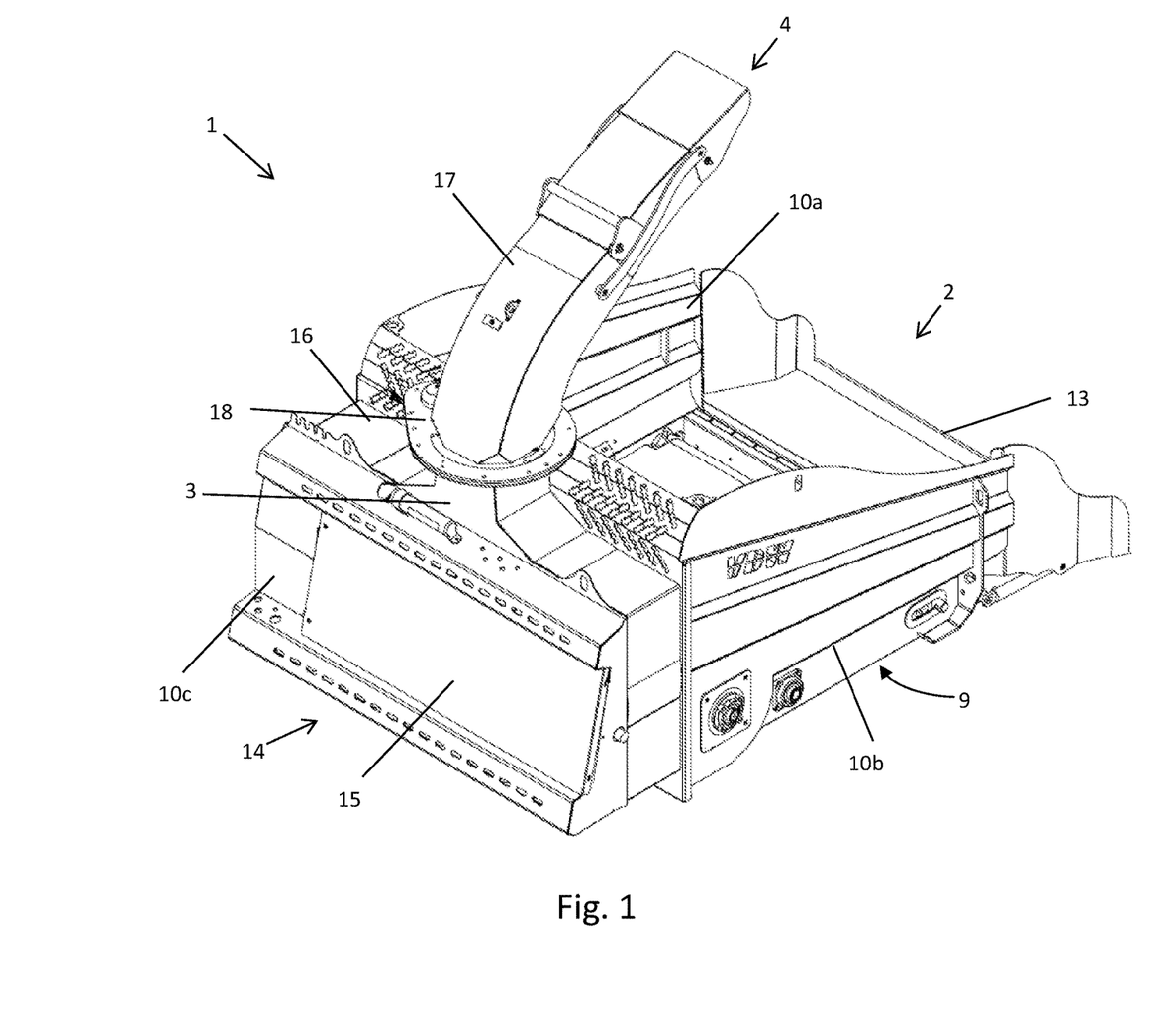
FIG. 1 shows a perspective view of the shredder according to an embodiment of the present invention.
Figure 2:
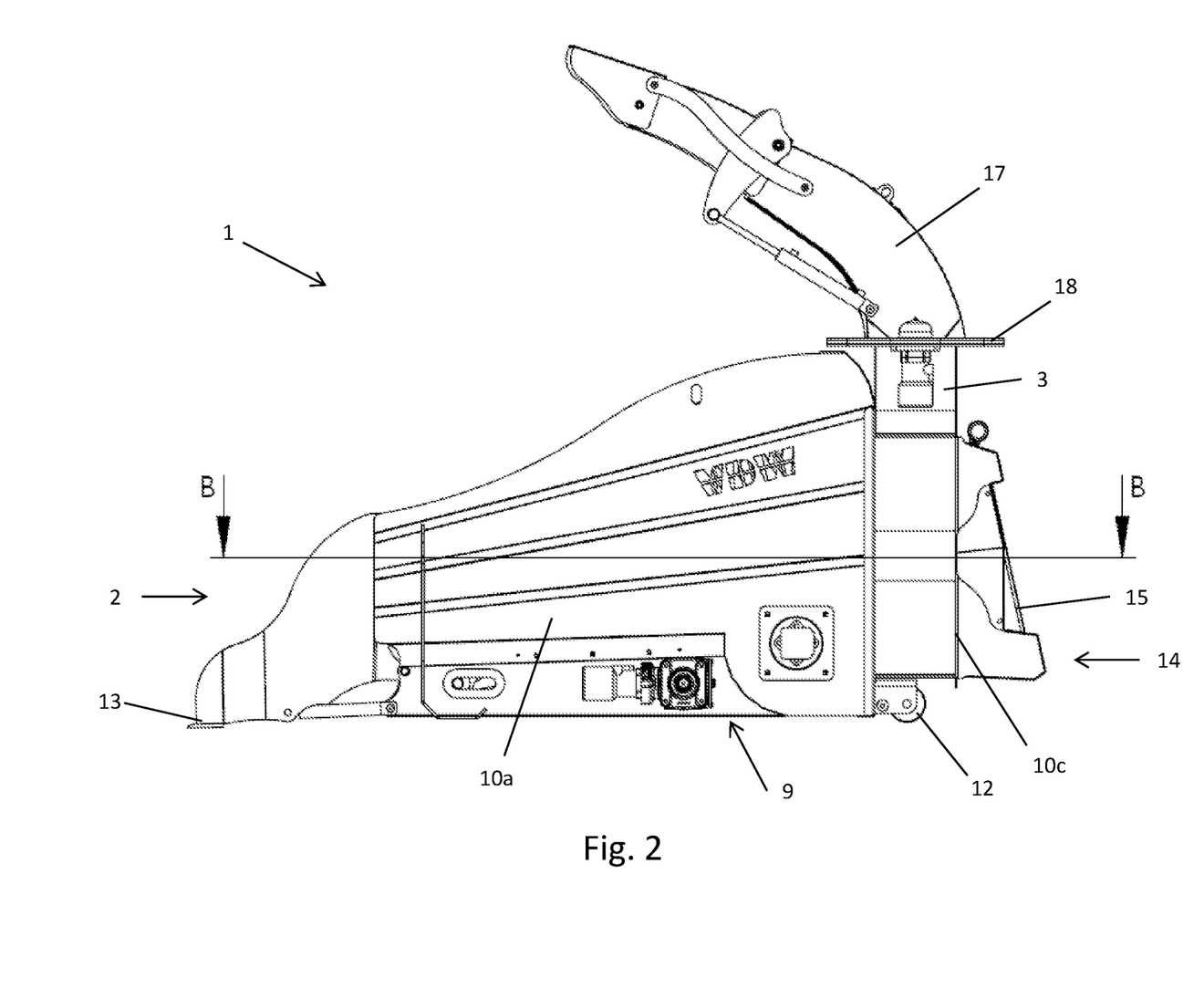
FIG. 2 shows a side view of the shredder of FIG. 1.
Figure 3:
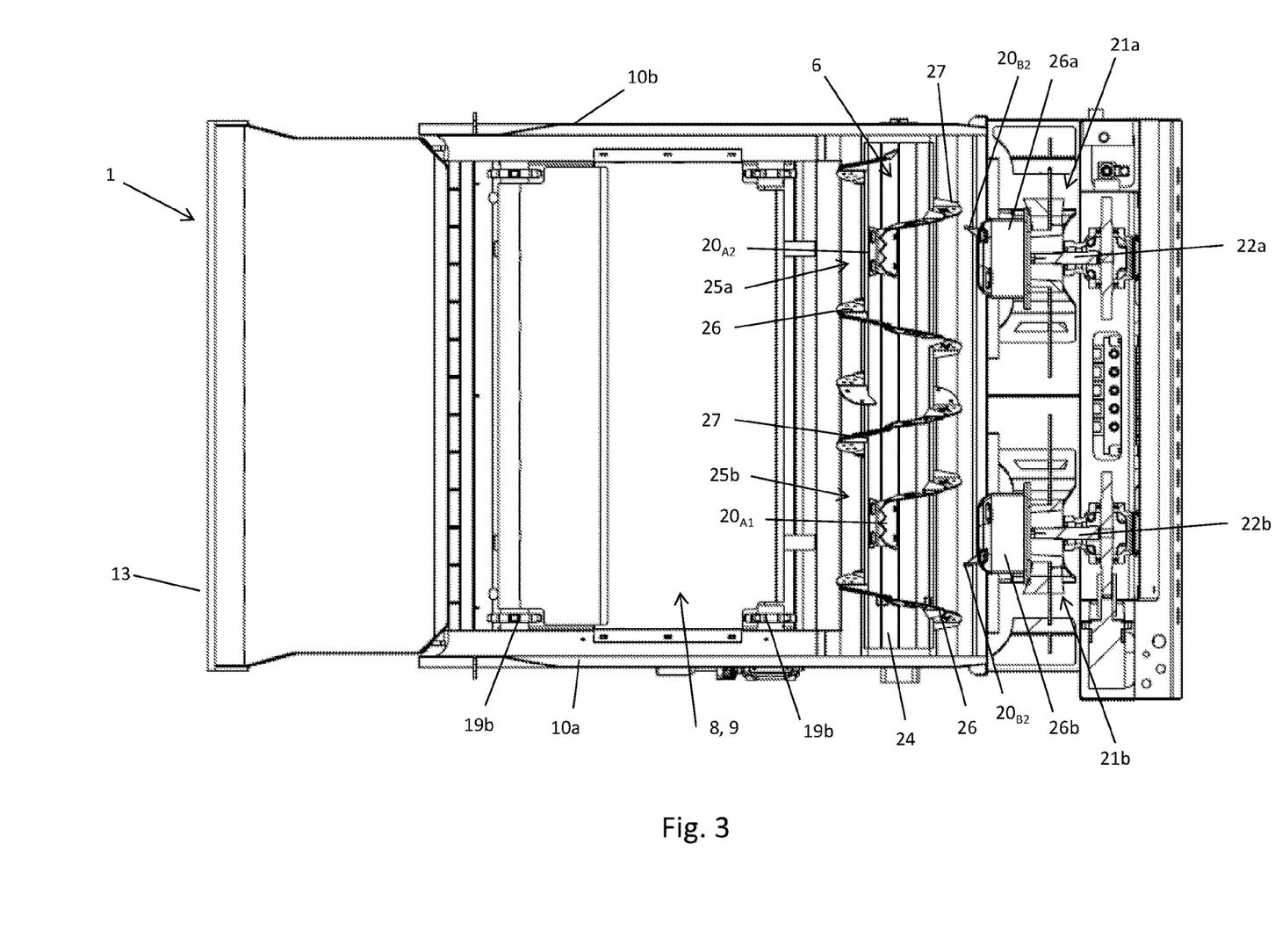
FIG. 3 shows a plan view of the shredder of FIG. 1 in a cross section along the line BB of FIG. 2.

FIG. 1 shows a perspective view of the shredder 1 according to an embodiment of the present invention. FIG. 2 shows a side view of the shredder 1 of FIG. 1. FIG. 3 shows a plan view of the shredder 1 of FIG. 1 in a cross section along the line BB of FIG. 2. The shredder 1 comprises a frame in which the various parts of the shredder 1 are arranged. The frame for example comprises the inlet opening 2 and the outlet opening 3, for example provided as openings in an otherwise completely closed frame. As shown in FIG. 3, the frame encloses the blowing device 5, the shredding device 7, the gathering device 6 and the feeding device 8. The frame for example supports the blowing device 5, the shredding device 7, the gathering device 6 and the feeding device 8. The frame is a contiguous set of walls, in particular substantially rigid walls, for example metal walls. Preferably, the frame chiefly extends along a longitudinal direction (for example along the section line BB as shown in FIG. 2). The frame further comprises a width direction and a height direction, both perpendicular to the longitudinal direction. The frame for example comprises a bottom wall 9 extending along the longitudinal direction and the width direction. The bottom wall 9 is arranged for supporting the weight of the agricultural products. The bottom wall comprises wheels 12 and a scooping edge 13 arranged for scooping up the agricultural products, such as bales of straw, lying on the floor. The scooping edge 13 is a free edge of the bottom wall 9. The frame further comprises upright walls, herein named further side walls 10a, 10b, 10c, coupled to the edges of the bottom wall 9. The frame comprises three side walls 10a, 10b, 10c, being two lateral side walls 10a, 10b extending along the length and height directions and a proximal side wall 10c extending along the width direction and chiefly along the height direction. The edge of the bottom wall 9 opposite the edge on which the proximal side wall 10c is provided, preferably remains a free edge, for example so as to act as a scooping edge 13. The proximal side wall 10c is preferably provided with a mounting mechanism 14 provided with a mounting plate 15 for mounting the frame to the agricultural vehicle. The mounting plate 15 is preferably at an angle to the proximal side wall 10c so that, when the agricultural vehicle holds the mounting plate 15 in a vertical position, the bottom wall 9 of the frame is tilted at an angle relative to the ground. The lateral side walls 10a, 10b ensure that the agricultural products are kept within the frame. The frame further comprises a top wall 16. The top wall 16 is provided with the outlet opening 3. Preferably, the top wall 16 is locally bent into a funnel shape, wherein the narrow end of the funnel shape forms the outlet opening 3. The funnel shape comprises a flange 18 near the outlet opening 3 for connecting to the flange of a blowing pipe 17 placed on top of the outlet opening 3. The blowing pipe 17 forms a conduit between the outlet opening 3 and an outflow opening 4. The top wall 16 is only provided above the blowing device 5. In the present embodiment, the feed direction is parallel to the longitudinal direction of the frame. The feeding device is constituted by the bottom wall 9 of the frame, wherein the agricultural products slide over the bottom wall, for example by tilting the agricultural device at an angle, for example by bringing the mounting plate 15 into a vertical position. The bottom wall 9 further comprises a movable carpet stretched across at least two driving rolls 19a, 19b. According to the present embodiment, the frame has a height along the height direction, for example defined by the height of the proximal side wall 10c, and the frame has a width along the width direction, for example defined by the width of the proximal side wall 10c. Preferably, the height of the frame is less than the width of the frame. Preferably, at least some of the parts of the shredder 1 are positioned sequentially along the longitudinal direction of the frame, for example in the following order: the inlet opening 2 provided with the scooping edge/free edge 13 of the bottom wall 9, followed by the feeding device 8, followed by the gathering device 6 provided with part of the shredding device 20A1, 20A2, followed by a subsequent part of the shredding device 20B1, 20B2, followed by the blowing device 5 and the outlet opening 3 provided on top thereof, and finally followed by the proximal side wall 10c.

Figure 4:
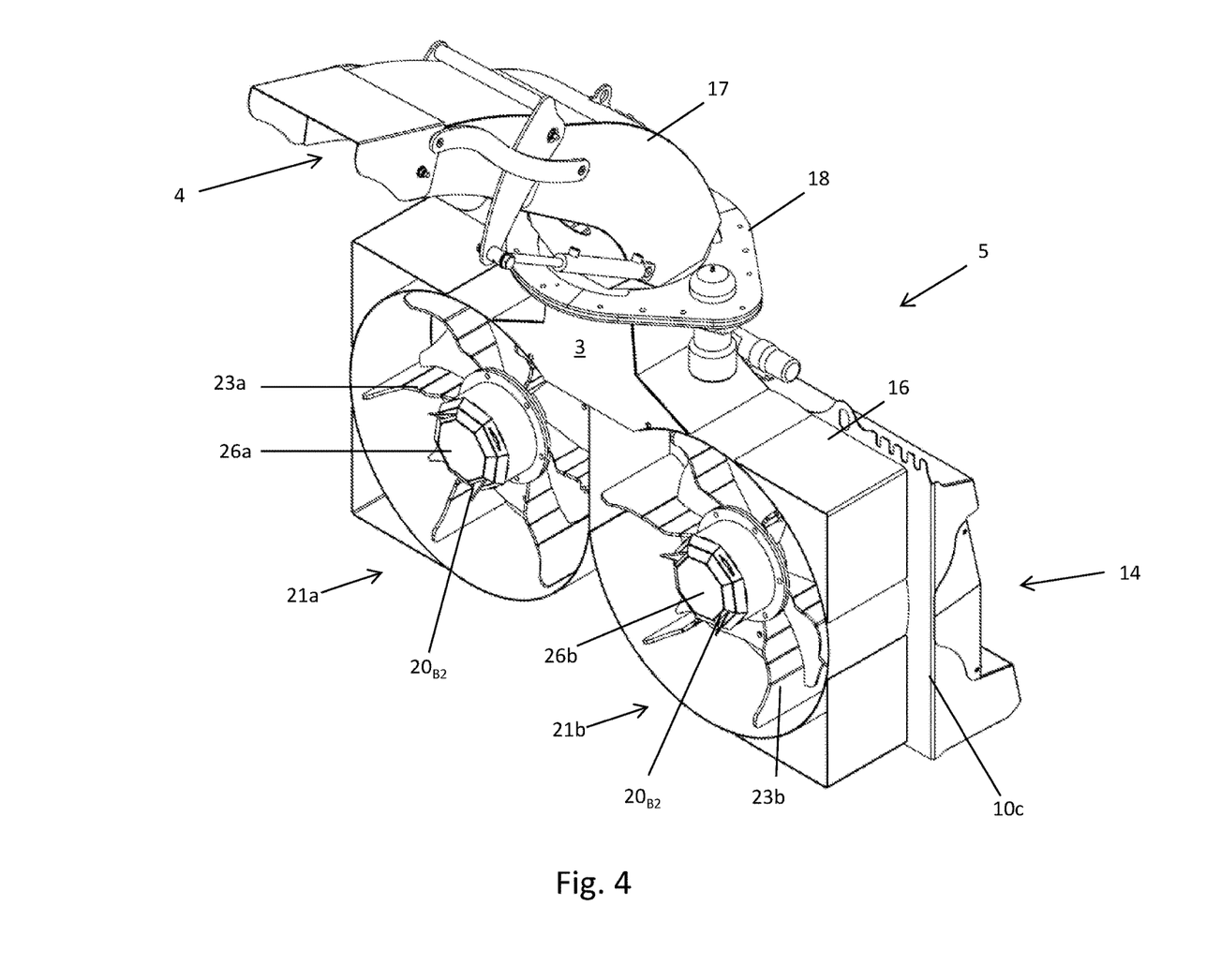
FIG. 4 shows a perspective view of the blowing device of the shredder of FIG. 1.
Figure 5:
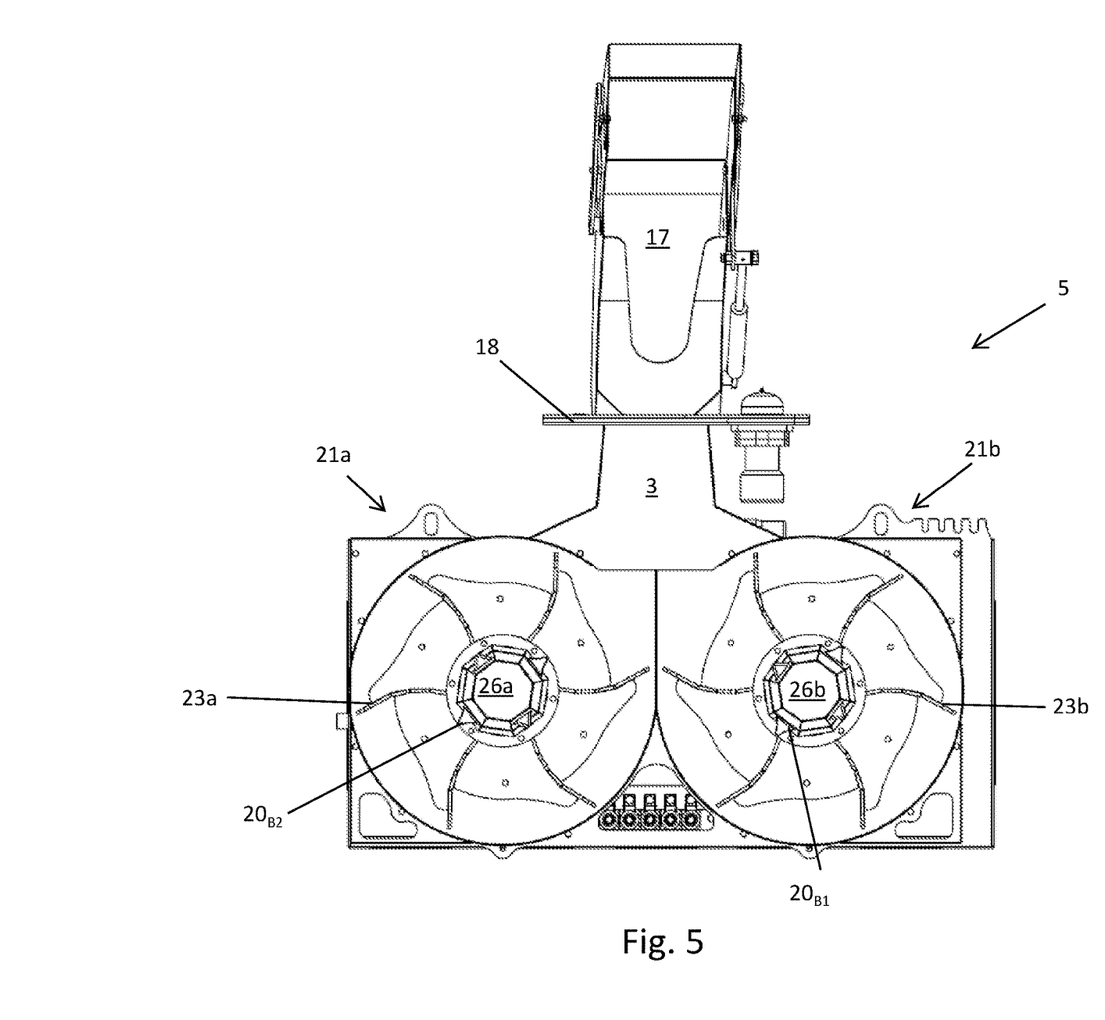
FIG. 5 shows a front view of the blowing device of FIG. 4.
Figure 6:
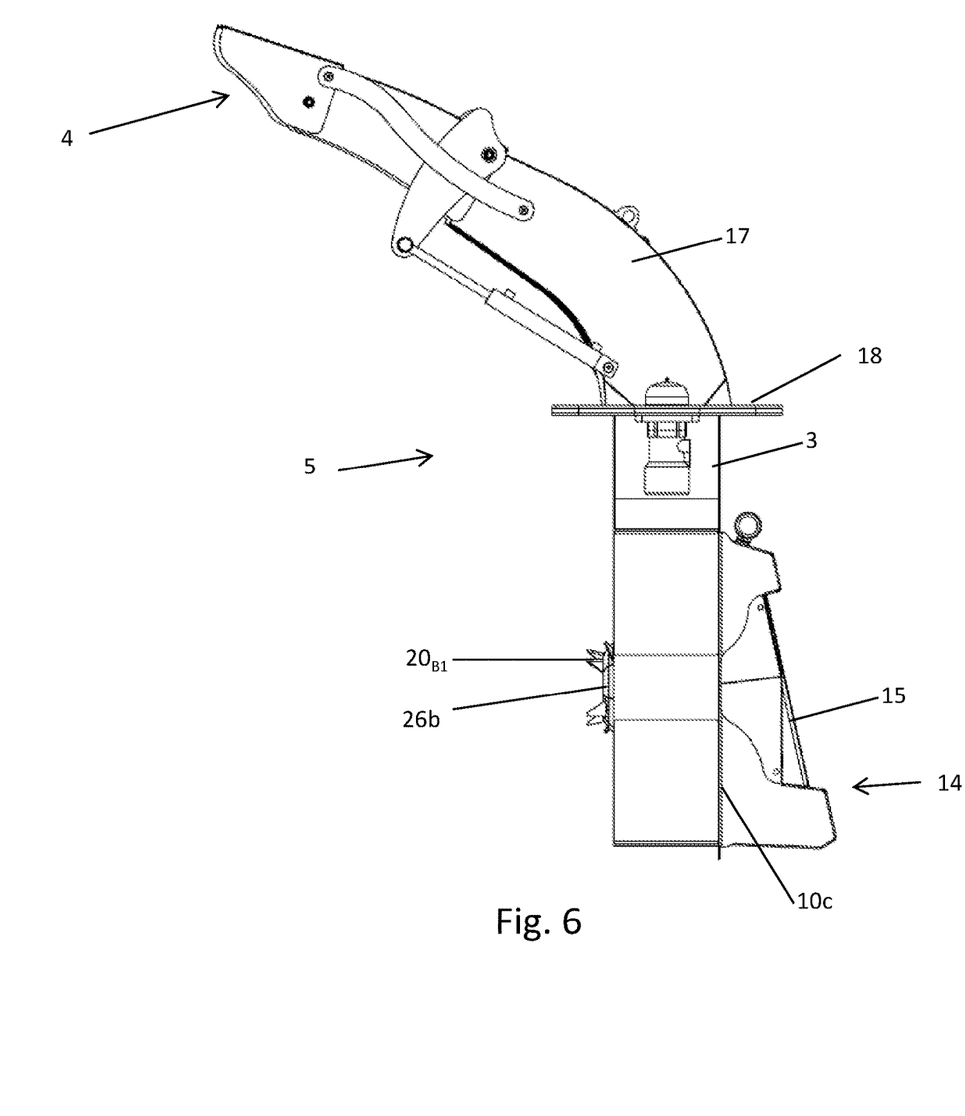
FIG. 6 shows a side view of the blowing device of FIG. 4.

FIGS. 4-6 show the blowing device 5 in particular. The blowing device 5 comprises two blowing elements 21a and 21b. Each blowing element 21a, 21b is rotatably arranged about a blowing rotational axis, wherein rotating the blowing element 21a, 21b about its blowing rotational axis causes the shredded agricultural products to be blown from the shredding device 20 toward and through the outlet opening 3. The first blowing element 21a and the second blowing element 21b are adjacent, i.e., are located in the same plane taken perpendicular to one of the blowing rotational axes. Each blowing element 21a, 21b comprises a blowing rotational shaft 22a, 22b extending along its blowing rotational axis and a set of blades 23a, 23b connected to the blowing rotational shaft 22a, 22b. The blades 23a, 23b are arranged, upon rotation of the blowing rotational shaft 22a, 22b, to suck in shredded agricultural products along a direction parallel to the blowing rotational axis, and to then blow the shredded agricultural products away radially toward and through the outlet opening 3. The first blowing rotational shaft 22a and the second blowing rotational shaft 22b are substantially parallel to each other. Each blowing element 21a, 21b is arranged for blowing the shredded agricultural products from the shredding device 20 toward and through the single outlet opening 3. To that end, the outlet opening 3 is located above the blowing device 5 at the boundary between two blowing elements 21a, 21b. The two blowing elements 21a, 21b are arranged to rotate in a reverse direction about their respective blowing rotational axes, so that the blades 23a, 23b of both blowing elements 21a, 21b carry out an upward movement near the boundary between the two blowing elements 21a, 21b. The first and second blowing rotational axes are substantially parallel to the feed direction and the longitudinal direction of the frame.

As shown in particular in FIGS. 1-3, the gathering device 6 is arranged for piling up/concentrating the supplied or shredded agricultural products in a pile near the blowing rotational axes. The gathering device 6 gathers the agricultural products by moving the agricultural products in a direction substantially perpendicular to the feed direction, in particular substantially along the width direction of the frame. The gathering device 6 comprises a gathering shaft 24 rotatable about a gathering rotation axis. The gathering shaft 24 is a single rectilinear shaft. The gathering shaft 24 is arranged to rotate in its entirety about the gathering rotational axis. The gathering rotational axis is substantially perpendicular to the feed direction, in particular substantially along the width direction of the frame. The gathering rotational axis is substantially perpendicular to the direction of the parallel blowing rotational axes. The gathering shaft 24 is provided with two helical portions 25a, 25b. Each helical portion 25a, 25b comprises a left-handed screw portion 26 and a right-handed screw portion 27. The gathering shaft 24 is for example a cylindrical shaft provided with a screw thread. The thread is constituted by a long, narrow plate arranged helically about the cylindrical shaft. The left-handed screw portion 26 and right-handed screw portion 27 of each helical portion 25a, 25b of the gathering shaft 24 are preferably positioned relative to one another in such a way that the agricultural products reaching the helical portion 25a, 25b at a left-handed screw portion 26 are moved toward the right-handed screw portion 27 of that helical portion 25a, 25b, and that the agricultural products reaching the helical portion 25a, 25b at a right-handed screw portion 27 are moved toward the left-handed screw portion 26 of that helical portion 25a, 25b. Each helical portion 25a, 25b is positioned relative to the blowing rotational axes in such a way that the junction between the left-handed screw portion 26 and the right-handed screw portion 27 is located near one of the blowing rotational axes. As a result, each helical portion 25a, 25b gathers the agricultural products near a blowing rotational axis assigned to it. In particular, the helical portion 25a concentrates the agricultural products near the blowing rotational axis of blowing element 22a, and the helical portion 25b concentrates the agricultural products near the blowing rotational axis of blowing element 22b.

As shown in particular in FIGS. 1-3, the shredding device 20 comprises a set of shredding teeth 20A1, 20A2, 20B1, 20B2. The shredding teeth 20A1, 20A2, 20B1, 20B2 are a set of sharp elements arranged for shredding and/or cutting the agricultural products when the agricultural products and the shredding teeth come into contact with each other and move relative to each other. The shredding device 20 is distributed over different locations in the shredder 1. A first part of the shredding device 20 is provided on the gathering device 6. To this end, a set of shredding teeth, 20A1 and 20A2, respectively, is provided in each helical portion, 25a and 25b, respectively, of the gathering shaft 24. Each respective set of shredding teeth 20A1, 20A2 is interposed between the left-handed screw portion 26 and the right-handed screw portion 27 of their respective helical portion 25a, 25b. Rotating the gathering shaft 24 about the gathering rotational axis thereby causes rotation of the shredding teeth 20A1, 20A2, so as to shred and/or cut the agricultural products. This implementation is especially advantageous as the agricultural products, due to the action of the gathering shaft 24, are already conveyed toward the junction of the left-handed screw portion 26 and the right-handed screw portion 27 of the helical portion 25a, 25b, where the shredding teeth 20A1, 20A2 are provided. A second part of the shredding device 20 is coupled to the blowing device 5. To this end, a shredding rod 26a, 26b is coupled to each blowing rotational shaft 22a, 22b in a coaxial arrangement. Each shredding rod 26a, 26b is provided with a further set of shredding teeth 20B2, 20B1. Each shredding rod 26a, 26b is rotatably arranged relative to the blowing rotational axis of the blowing rotational shaft 22a, 22b to which the shredding rod 26a, 26b is coupled. Rotating the shredding rod about the blowing rotational axis causes a rotation of the shredding teeth 20B2, 20B1, resulting in the agricultural products being shredded.

The invention claimed is:

1. Shredder for shredding agricultural products, the shredder comprising:
   a) an inlet opening through which the agricultural products are loaded into the shredder,
   b) a shredding device for shredding the loaded agricultural products,
   c) an outlet opening through which the shredded agricultural products are removed from the shredder,
   d) a blowing device for blowing the shredded agricultural products from the shredding device toward and through the outlet opening, wherein the blowing device comprises a first blowing element, wherein the first blowing element is rotatably arranged about a first blowing rotational axis, wherein rotating the first blowing element about the first blowing rotational axis causes the shredded agricultural products to be blown from the shredding device toward and through the outlet opening,
   e) a feeding device for transporting the loaded agricultural products along a feed direction from the inlet opening toward the blowing device,
   wherein the blowing device further comprises a second blowing element, wherein the second blowing element is rotatably arranged about a second blowing rotational axis, wherein rotating the second blowing element about the second blowing rotational axis causes the shredded agricultural products to be blown from the shredding device toward and through the outlet opening,
   wherein the shredder further comprises a gathering device arranged for gathering the agricultural products in a pile near the blowing rotational axes,
   wherein the gathering device is a gathering shaft rotatable about a gathering rotation axis, wherein the gathering shaft is provided with at least one helical portion comprising a left-handed screw portion and a right-handed screw portion, and
   wherein the shredding device comprises a set of shredding teeth, wherein the set of shredding teeth is provided in each helical portion of the gathering shaft between the left-handed screw portion and the right-handed screw portion, and wherein rotating the gathering shaft about the gathering rotational axis causes rotation of the shredding teeth for shredding agricultural products.

2. The shredder according to claim 1, wherein the first blowing rotational axis and the second blowing rotational axis are substantially parallel to each other.

3. The shredder according to claim 1, wherein the first blowing rotational axis and the second blowing rotational axis are not coaxial.

4. The shredder according to claim 1, wherein the first blowing element and the second blowing element are adjacent.

5. The shredder according to claim 1, wherein the feed direction is substantially parallel to the first blowing rotational axis.

6. The shredder according to claim 1, wherein each blowing element comprises a blowing rotational shaft extending along the blowing rotational axis, and wherein each blowing element comprises a set of blades connected to the blowing rotational shaft.

7. The shredder according to claim 1, wherein the outlet opening is a single outlet opening, and wherein each blowing element is arranged for blowing the shredded agricultural products from the shredding device toward and through the single outlet opening.

8. The shredder according to claim 1, wherein the gathering device gathers the agricultural products by moving the agricultural products in a direction substantially perpendicular to the feed direction.

9. The shredder according to claim 1, wherein the number of helical portions of the gathering shaft equals the number of blowing units in the blowing device.

10. The shredder according to claim 6, wherein the shredding device is provided with a shredding rod provided with a set of shredding teeth, wherein the shredding rod is rotatably arranged relative to a shredding rod rotational axis and wherein rotating the shredding rod about the shredding rod rotational axis causes rotation of the shredding teeth for shredding agricultural products, and wherein the shredding rod rotational axis is parallel to the blowing rotational axis, wherein the shredding rod rotational axis is coaxial to the blowing rotational axis, and wherein the shredding rod is connected to the blowing rotational shaft.

11. The shredder according to claim 1, wherein the feeding device is at least one of an inclined plane, a moving floor and a pulling screw.

12. Agricultural vehicle provided with a shredder according to claim 1.

* * * * *